US012343768B2

(12) United States Patent
Peng et al.

(10) Patent No.: US 12,343,768 B2
(45) Date of Patent: Jul. 1, 2025

(54) WAFER ADSORPTION DEVICE

(71) Applicants: SHENG CHUAN TECHNOLOGY CO., LTD., Taoyuan (TW); Hsin-Jung Peng, Taoyuan (TW); Tsung-Che Yu, Taoyuan (TW)

(72) Inventors: Hsin-Jung Peng, Taoyuan (TW); Tsung-Che Yu, Taoyuan (TW)

(73) Assignees: SHENG CHUAN TECHNOLOGY CO., LTD., Taoyuan (TW); Hsin-Jung Peng, Taoyuan (TW); Tsung-Che Yu, Taoyuan (TW)

( * ) Notice: Subject to any disclaimer, the term of this patent is extended or adjusted under 35 U.S.C. 154(b) by 187 days.

(21) Appl. No.: 18/467,210

(22) Filed: Sep. 14, 2023

(65) Prior Publication Data

US 2024/0116092 A1 Apr. 11, 2024

(30) Foreign Application Priority Data

Oct. 6, 2022 (TW) ................................. 111138082

(51) Int. Cl.
*B08B 13/00* (2006.01)

(52) U.S. Cl.
CPC .................................... *B08B 13/00* (2013.01)

(58) Field of Classification Search
CPC ...................................................... B08B 13/00
See application file for complete search history.

(56) References Cited

U.S. PATENT DOCUMENTS

| | | | | |
|---|---|---|---|---|
| 7,056,392 | B1 * | 6/2006 | Kuroki | H01L 21/68728 34/328 |
| 10,410,906 | B2 * | 9/2019 | Wang | H01L 21/67259 |
| 2013/0127102 | A1 * | 5/2013 | Kinoshita | H01L 21/6838 29/559 |
| 2022/0203555 | A1 * | 6/2022 | Tan | B25J 11/0095 |
| 2022/0399218 | A1 * | 12/2022 | Tan | H01L 21/67778 |

FOREIGN PATENT DOCUMENTS

| | | | | | |
|---|---|---|---|---|---|
| CN | 201490173 | U | | 5/2010 | |
| CN | 107078084 | A | | 8/2017 | |
| CN | 206947302 | U | * | 1/2018 | |
| CN | 111063631 | A | * | 4/2020 | H01L 21/02013 |
| CN | 112490171 | A | | 3/2021 | |
| CN | 113172483 | A | * | 7/2021 | B24B 1/00 |

(Continued)

*Primary Examiner* — Benjamin L Osterhout
(74) *Attorney, Agent, or Firm* — Best & Flanagan LLP

(57) ABSTRACT

A wafer adsorption device has a base, a guiding ring, and a cover. An inlet is formed through the base. The guiding ring is mounted on the base and includes a ring body and multiple bumps, the bumps protrude from a top surface of the ring body and are spaced from each other. Multiple flow channels are recessed from a surface of the cover, and each one of the flow channels is arc-shaped. An end of each one of the flow channels is connected to each other and fluidly communicates to the inlet, and another end extends outward. The cover is mounted in the ring body and securely mounted on the base, and the cover is spaced apart from the guiding ring. Therefore, when placing a wafer on the wafer adsorption device, a contacting area of the wafer may be reduced to further reduce a probability of scratching.

4 Claims, 5 Drawing Sheets

(56) References Cited

FOREIGN PATENT DOCUMENTS

| | | | | | |
|---|---|---|---|---|---|
| CN | 114454203 | A | * | 5/2022 | .......... B25J 15/0616 |
| CN | 115547916 | A | * | 12/2022 | |
| JP | H09-045750 | A | | 2/1997 | |
| JP | 2007-067054 | A | | 3/2007 | |
| JP | 2008-087910 | A | | 4/2008 | |
| JP | 2013-161935 | A | | 8/2013 | |
| JP | 2015-537385 | A | | 12/2015 | |
| TW | 374935 | B | | 11/1999 | |
| TW | 202213446 | A | * | 4/2022 | ....... H01L 21/67126 |

* cited by examiner

WAFER ADSORPTION DEVICE

BACKGROUND OF THE INVENTION

1. Field of the Invention

The present invention relates to a wafer adsorption device, especially to a wafer adsorption device that fixes a wafer by blowing airflows.

2. Description of the Prior Arts

A step in a conventional wet process of manufacturing semi-conductors is washing a wafer backside. Before washing the wafer backside, a wafer needs to be fixed on an adsorption dish. The adsorption dish fixes the wafer on a top surface of the adsorption dish via multiple adsorption holes formed on the top surface, then the adsorption dish rotates together with the wafer, and a cleaning solvent is sprayed on the wafer while the wafer is rotating.

Due to fixing the wafer via adsorption, besides forming a certain amount of the adsorption holes, the top surface of the conventional adsorption dish needs to contact the wafer in a certain area to keep stable. However, a risk of scratching the wafer rises as the area of the top surface contacting the wafer is enlarging, and the wafer may be prone to scratching by sliding during rotation, thereby reducing a yield of production.

To overcome the shortcomings, the present invention provides a wafer adsorption device to mitigate or obviate the aforementioned problems.

SUMMARY OF THE INVENTION

The main objective of the present invention is to provide a wafer adsorption device that is capable of forming curved airflows and blowing toward a wafer, thereby fixing the wafer on the wafer adsorption device.

The wafer adsorption device has a base, a guiding ring, and a cover. The base has an inlet, and the inlet is formed through the base. The guiding ring includes a ring body and multiple bumps. The ring body is hollow and has a ring top surface, a ring bottom surface, and an inner annular lateral surface. An inclined surface is formed adjacent to an outer border of the ring top surface, and the inclined surface faces outward and is inclined upward. The inner annular lateral surface is located between the ring top surface and the ring bottom surface, and the guiding ring is mounted on the base via the ring bottom surface. Bumps are formed on the ring top surface and spaced apart from each other. The cover is mounted in the ring body of the guiding ring and includes a cover top surface, a cover bottom surface, multiple flow channels, and an outer annular lateral surface. The cover is securely mounted on the base via the cover bottom surface. Flow channels are recessed from the cover bottom surface, and each one of the flow channels is arc-shaped; an end of each one of the flow channels is connected to each other and fluidly communicates with the inlet of the base, and another end of each one of the flow channels extends outward and forms an opening. The outer annular lateral surface is located between the cover top surface and the cover bottom surface, and the outer annular lateral surface is curved and spaced apart from the inner annular lateral surface.

The wafer adsorption device is capable of reducing a contacting area of the wafer to the wafer adsorption device to reduce a probability of scratching the wafer during sliding; furthermore, blowing an airflow to the wafer may prevent dusts from attaching onto the wafer, and thereby keeps the wafer clean.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
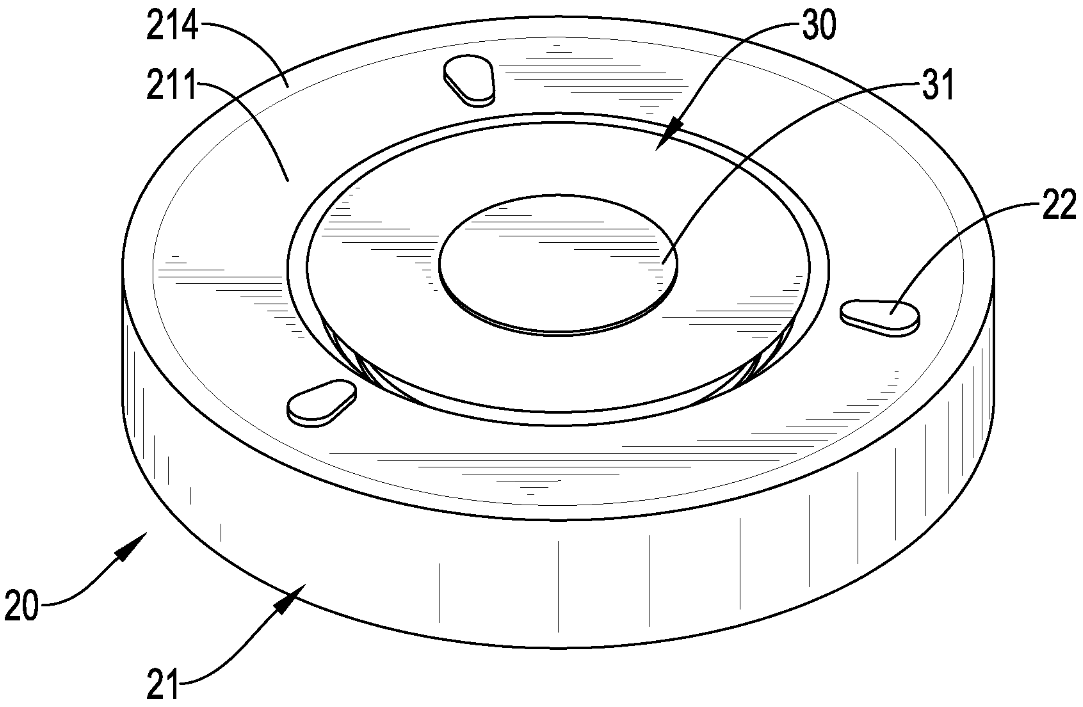
FIG. 1 is a perspective view of a wafer adsorption device in accordance with the present invention.
Figure 2:
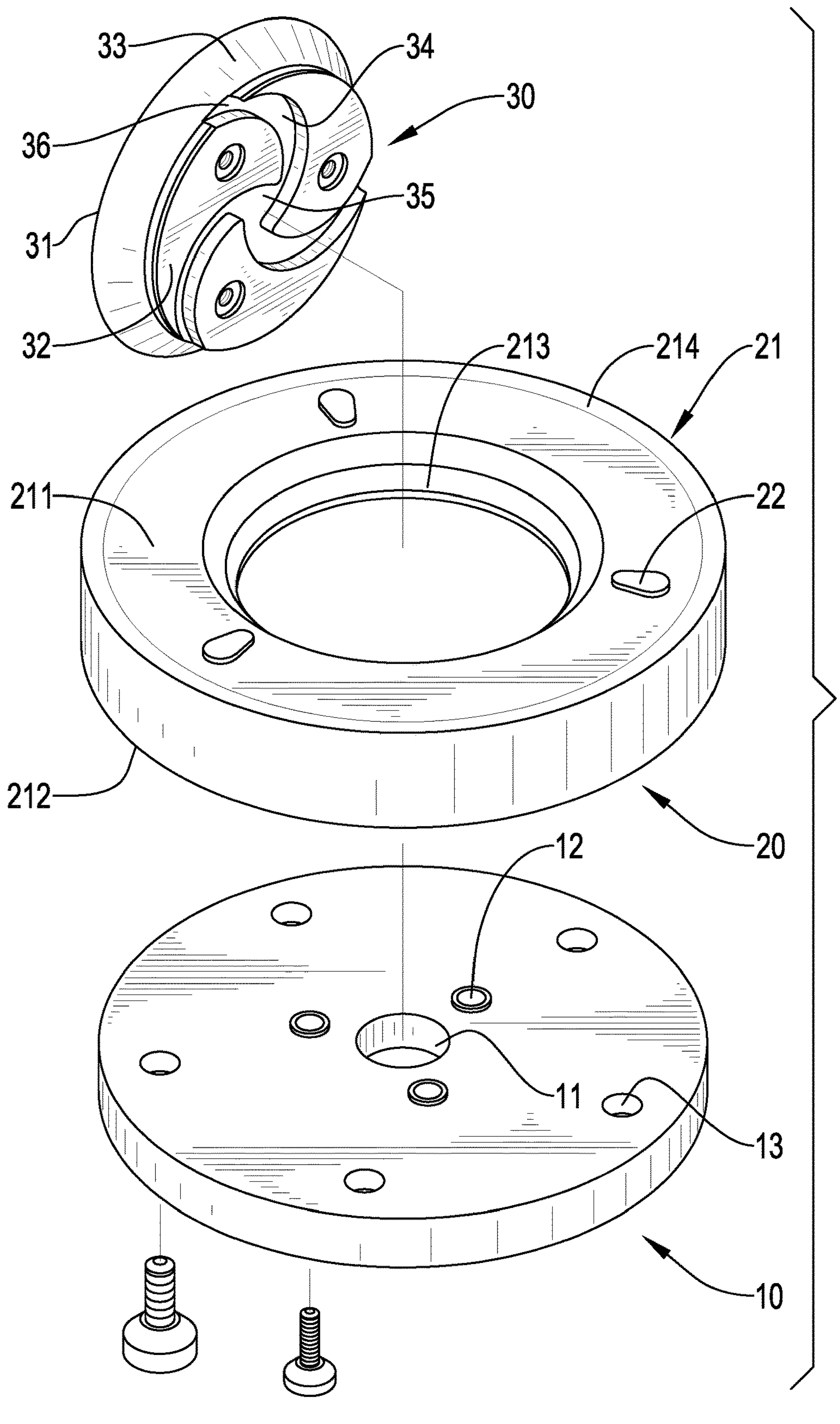
FIG. 2 is an exploded view of the wafer adsorption device in FIG. 1.

With reference to FIGS. 1 and 2, a wafer adsorption device in accordance with the present invention includes a base 10, a guiding ring 20, and a cover 30.

The base 10 is a round board and has an inlet 11, multiple inner base holes 12, and multiple outer base holes 13. The inlet 11 is formed through the base 10 and located at a central site of the base 10. The inner base holes 12 surround the inlet 11 and are spaced apart from each other, and the outer base holes 13 also surround the inlet 11 and are spaced apart from each other, but it is not limited thereto, and the base 10 may be altered according to different requirements.

Figure 4:
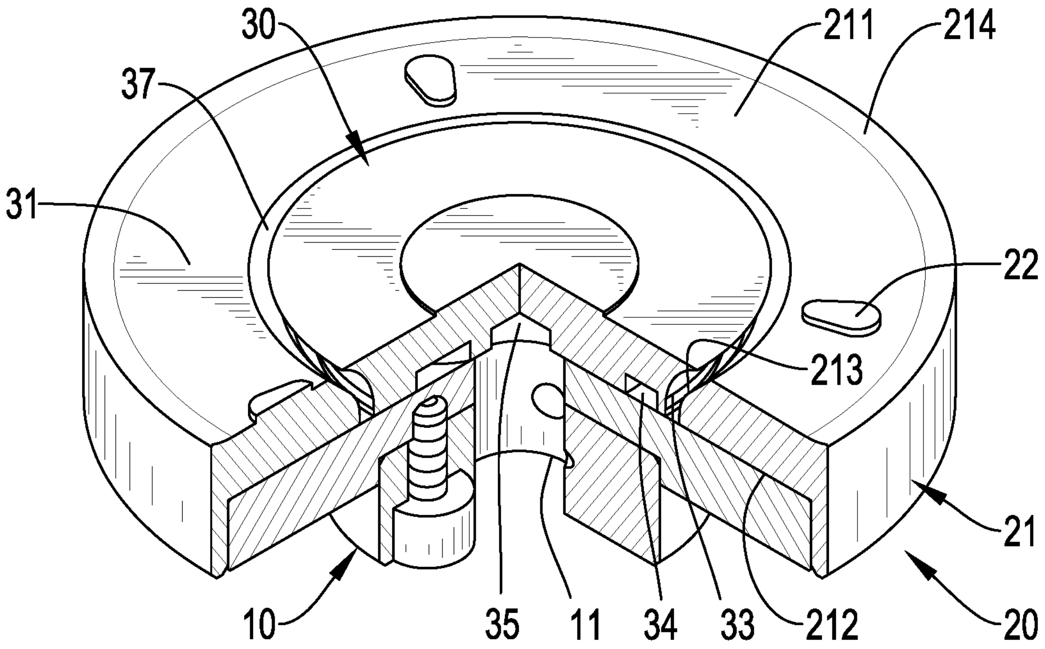
FIG. 4 is a partial cross-sectional view of the wafer adsorption device in FIG. 1.

With reference to FIGS. 2 and 4, the guiding ring 20 includes a ring body 21 and multiple bumps 22. The ring body 21 is hollow and has a ring top surface 211, a ring bottom surface 212, and an inner annular lateral surface 213. The inner annular lateral surface 213 is located between the ring top surface 211 and the ring bottom surface 212. The bumps 22 protrude from the ring top surface 211 and are spaced apart from each other; to be more precise, each one of the bumps 22 protrudes upward from the ring top surface 211. Multiple fixing units are respectively disposed through the outer base holes 13, and the guiding ring 20 is fixed on the ring bottom surface 212 via said fixing units, thereby fixing the guiding ring 20 on the base 10. In this embodiment, the inner annular lateral surface 213 is a curved surface, which is inclined outward from the ring bottom surface 212 to the ring top surface 211, i.e., the inner annular lateral surface 213 is shaped like a flared funnel. An inclined surface 214 is formed adjacent to an outer border of the ring top surface 211, the inclined surface 214 faces outward and is inclined upward, but it is not limited thereto, and the guiding ring 20 may be altered according to different requirements.

Figure 3:
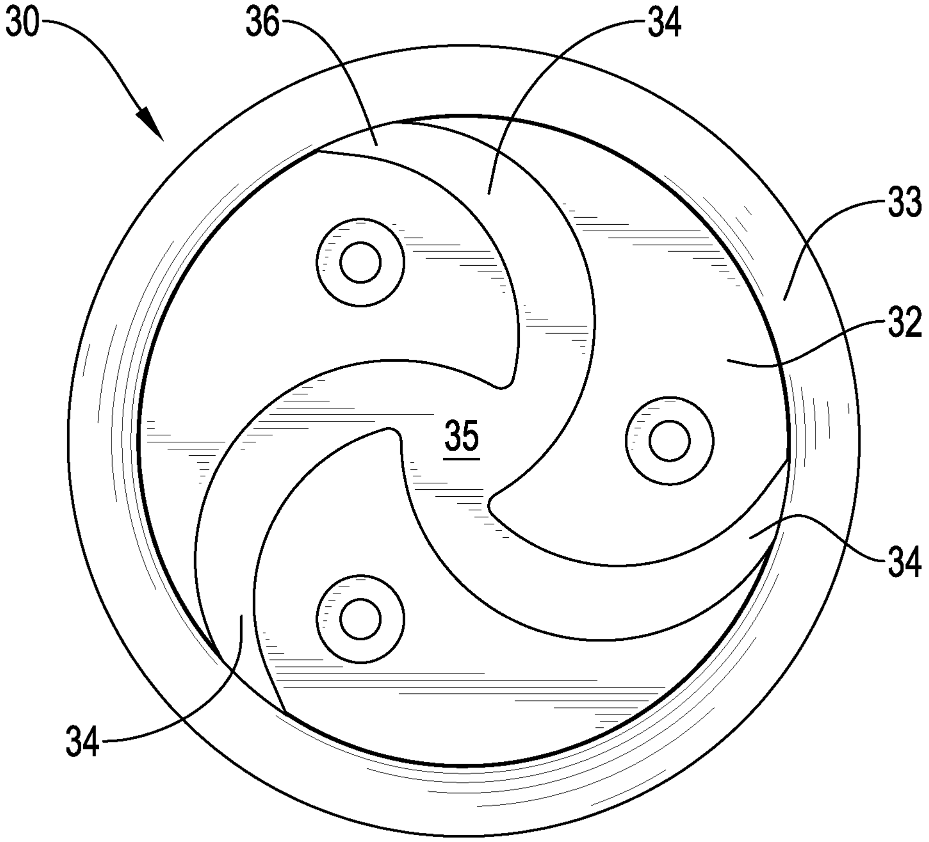
FIG. 3 is a bottom view of a cover of the wafer adsorption device in FIG. 1.

With reference to FIGS. 2 to 4, the cover 30 includes a cover top surface 31, a cover bottom surface 32, and an outer annular lateral surface 33. The cover 30 is mounted in the ring body 21 of the guiding ring 20. Multiple fixing units are respectively disposed through the inner base holes 12, and the cover 30 is securely mounted on the base 10 via said fixing units fastened to the cover bottom surface 32.

The outer annular lateral surface 33 is located between the cover top surface 31 and the cover bottom surface 32. Multiple flow channels 34 are recessed from the cover bottom surface 32. An end of each one of the flow channels 34 is connected to one another to form a converging zone 35, and another end of each one of the flow channels 34 extends outward and forms an outlet 36. In this embodiment, a number of the flow channels 34 is preferably three and each one of the flow channels 34 is arc-shaped. The flow channels 34 are curved in a same direction; to be more precise, as shown in FIG. 3, the end of each one of the flow channels 34 which forms the outlet 36 is curved counterclockwise with respect to the end connected to another flow channel 34, but it is not limited thereto, and the flow channels 34 may be altered in number or shape according to different requirements. The converging zone 35 fluidly communicates with the inlet 11.

The outer annular lateral surface 33 is a curved surface, and the outer annular lateral surface 33 is parallel to and spaced apart from the inner annular lateral surface 213, and thereby an annular exit of airflow is formed between the cover 30 and the guiding ring 20, and a flow curving zone 37 is formed between the outer annular lateral surface 33 and the inner annular lateral surface 213.

Figure 5:
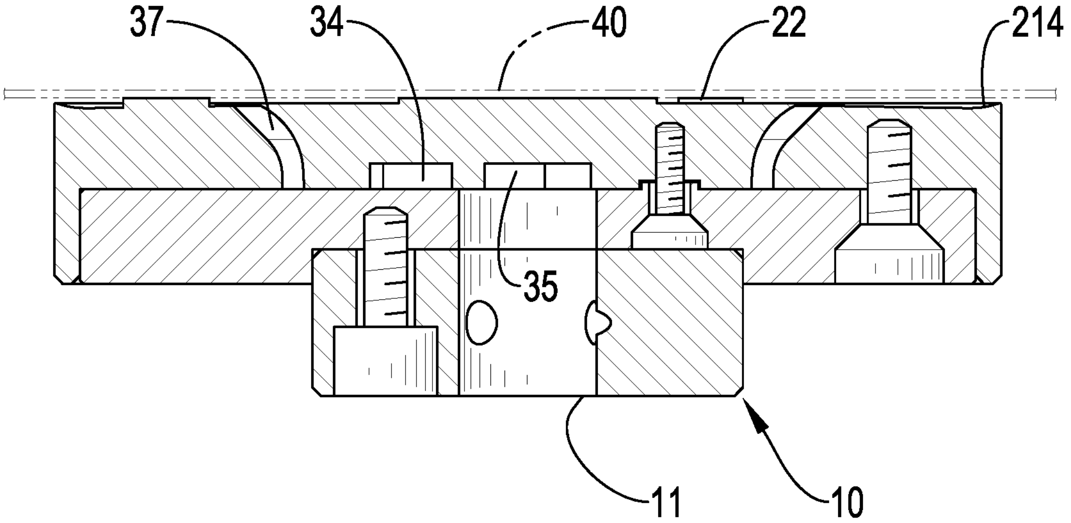
FIG. 5 is a cross-sectional view of the wafer adsorption device in FIG. 1.

With reference to FIGS. 2 and 5, to use the wafer adsorption device, a wafer 40 is placed on the bumps 22, the base 10 is connected to an external airflow supplier (not shown in the drawings) to generate an airflow, and the airflow flows into the wafer adsorption device through the inlet 11. After flowing to the converging zone 35, the airflow splits and flows into each one of the flow channels 34, and then flows out from the outlets 36. Because each one of the outlets 36 is an oblique opening, the airflows in the flow curving zone 37 flow along a same direction and form curved airflows, and then the airflows flow out and hit the wafer 40. When the airflow hits the wafer 40, the airflow flows outward along a bottom surface of the wafer 40 and flows out through the inclined surface 214. As a flow velocity of the airflow below the wafer 40 is larger than a flow velocity of the airflow above the wafer 40, a pressure above the wafer 40 is larger than a pressure below the wafer 40, and the wafer 40 is fixed on the bumps 22 in an approximate suspending state, thereby reducing a contacting area of the wafer 40 to the wafer adsorption device compared to the prior art, and thus a probability of scratching the wafer 40 also reduces. In addition, the airflow may prevent dusts from attaching onto the wafer 40, and thereby keeps the wafer 40 clean.

Besides, in the aforementioned process, the airflow is capable of supporting the wafer 40 by pushing on a bottom surface of the wafer 40 due to the inclined surface 214 guiding the airflow flowing upward, and thereby forces on the wafer 40 may be more evenly distributed to increase fixing stability and reduce deformation of the wafer 40.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A wafer adsorption device comprising:

a base having an inlet, and the inlet formed through the base;

a guiding ring including:

a ring body being hollow and having a ring top surface and a ring bottom surface, an inclined surface formed adjacent to an outer border of the ring top surface, and the inclined surface facing outward and inclined upward; and an inner annular lateral surface located between the ring top surface and the ring bottom surface, and the guiding ring mounted on the base via the ring bottom surface; and multiple bumps formed on the ring top surface and spaced apart from each other; and a cover mounted in the ring body of the guiding ring and including:

a cover top surface;

a cover bottom surface, and the cover securely mounted on the base via the cover bottom surface;

multiple flow channels recessed from the cover bottom surface, and each one of the flow channels being arc-shaped; an end of each one of the flow channels connected to each other and fluidly communicating with the inlet of the base, and another end of each one of the flow channels extending outward and forming an opening; and an outer annular lateral surface located between the cover top surface and the cover bottom surface, and the outer annular lateral surface being curved and spaced apart from the inner annular lateral surface.

2. The wafer adsorption device as claimed in claim 1, wherein:

the inner annular lateral surface is a curved surface, and the inner annular lateral surface is parallel to the outer annular lateral surface.

3. The wafer adsorption device as claimed in claim 1, wherein:

each one of the bumps protrudes upward from the ring top surface.

4. The wafer adsorption device as claimed in claim 2, wherein:

each one of the bumps protrudes upward from the ring top surface.

* * * * *